(12) United States Patent
Cheng et al.

(10) Patent No.: US 6,240,287 B1
(45) Date of Patent: May 29, 2001

(54) PROCESSING OVERLOAD CONTROL AT BASE STATIONS OF CELLULAR WIRELESS COMMUNICATION SYSTEMS

(75) Inventors: Terry Si-Fong Cheng; Ching Yao Huang, both of Randolph; Joe Huang, Bloomfield; Bee Yun Yu, Morristown, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/167,157

(22) Filed: Oct. 6, 1998

(51) Int. Cl.$^7$ ...................................................... H04Q 7/30
(52) U.S. Cl. .................. 455/422; 455/403; 455/455; 455/440; 370/342; 375/346
(58) Field of Search .................................. 455/422, 453, 455/436, 442, 440, 33.1, 33.4, 54.1, 56.1, 52.1, 53.1, 115, 403, 455, 516, 456; 370/331–335, 392, 441, 479; 709/200, 205, 206; 375/346, 200, 205

(56) References Cited

U.S. PATENT DOCUMENTS

| | | | |
|---|---|---|---|
| 5,245,629 | * 9/1993 | Hall | 375/1 |
| 5,475,861 | * 12/1995 | Hall | 455/331 |
| 5,745,520 | * 4/1998 | Love et al. | 375/200 |
| 5,940,430 | * 8/1999 | Love et al. | 375/200 |
| 6,085,107 | * 7/2000 | Persson et al. | 455/522 |

\* cited by examiner

*Primary Examiner*—Daniel Hunter
*Assistant Examiner*—Pablo Tran
(74) *Attorney, Agent, or Firm*—Law Office of Leo Zucker

(57) ABSTRACT

Call processing overload at a base station of a cellular wireless network is controlled by monitoring a level of call processing at the base station, and reducing a present handoff rate for active users when the call processing level exceeds a first threshold less than a maximum call processing capacity. When the call processing level at the base station exceeds a second threshold greater than the first threshold, a present rate of call originations or terminations is reduced while further reducing the handoff rate.

14 Claims, 4 Drawing Sheets

| PRIMITIVE | DESCRIPTION | VALUE | SOURCE |
|---|---|---|---|
| | | CDMA | |
| HO | HANDOFF ADD AND DROP PER CALL | 2 o 10 | FIELD |
| PG | PAGE MESSAGE DURING BUSY HOUR | 10 (10 TIMES BHCA/CELL) | FIELD |
| AR | AUTONOMOUS REGISTRATION DURING BUSY HOUR | 0.03 (0.03 TIMES BHCA/CELL) | AR EVERY 30min |
| NOLOAD_RCC | RCC OCCUPANCY AT NO LOAD SITUATION | 15% | FIELD |
| MAX_RCC | RCC MAXIMUM ALLOWABLE OCCUPANCY | 90% | ASSUMPTION |

FIG. 1

| PRIMITIVE | DESCRIPTION | VALUE | SOURCE |
|---|---|---|---|
| | | CDMA | |
| HO | HANDOFF ADD AND DROP PER CALL | 2 to 10 | FIELD |
| PG | PAGE MESSAGE DURING BUSY HOUR | 10 (10 TIMES BHCA/CELL) | FIELD |
| AR | AUTONOMOUS REGISTRATION DURING BUSY HOUR | 0.03 (0.03 TIMES BHCA/CELL) | AR EVERY 30min |
| NOLOAD_RCC | RCC OCCUPANCY AT NO LOAD SITUATION | 15% | FIELD |
| MAX_RCC | RCC MAXIMUM ALLOWABLE OCCUPANCY | 90% | ASSUMPTION |

MAXIMUM ARRIVAL RATE VERSUS HANDOFF RATE per call

FIG. 4

| HANDOFF RATE PER CALL | MAXIMUM ALLOWABLE ARRIVAL RATE | RCC OCCUPANCY DUE TO OT | RCC OCCUPANCY DUE TO HO | RCC OCCUPANCY DUE TO OT + HO |
|---|---|---|---|---|
| 2 | 2.306628 | 17.30% | 46.13% | 63.43% |
| 3 | 1.764083 | 13.23% | 52.93% | 66.15% |
| 4 | 1.428163 | 10.71% | 57.13% | 67.84% |
| 5 | 1.199712 | 9.00% | 59.99% | 68.98% |
| 6 | 1.034269 | 7.76% | 62.06% | 69.81% |
| 7 | 0.908926 | 6.82% | 63.62% | 70.44% |
| 8 | 0.810679 | 6.08% | 64.85% | 70.93% |
| 9 | 0.7316 | 5.49% | 65.84% | 71.33% |
| 10 | 0.666578 | 5.00% | 66.66% | 71.66% |
| 11 | 0.61217 | 4.60% | 67.34% | 71.93% |
| 12 | 0.565974 | 4.24% | 67.92% | 72.16% |

PROCESSING OVERLOAD CONTROL AT BASE STATIONS OF CELLULAR WIRELESS COMMUNICATION SYSTEMS

BACKGROUND OF THE INVENTION

1. Field of the Invention

This invention relates to processing of call related operations at base stations of a cellular wireless communication system, and particularly to a processing management scheme that insures a base station will maintain its ability to process user call activities while handling an increasing number of active calls.

2. Discussion of the Known Art

A typical base station of a cellular wireless communication system has processing equipment that controls call-related activities such as, for example, call originations, call terminations, handoffs of active calls to or from the base station, and user registrations and paging. These activities all use or occupy processing time at the base station. For example, at base stations of code division multiple access (CDMA) systems, processing equipment known as a radio control complex (RCC) includes a number of associated hardware units that interface with a system bus with which a core processor unit (CPU) is connected. As user activity in a base station's area of coverage or "cell" increases, the RCC approaches a limit of its maximum capacity to handle both new and ongoing traffic functions. Co-pending U.S. patent application Ser. No. 09/131,390 filed Aug. 7, 1998, entitled "CDMA Base Station Assisted Soft Handoff" and assigned to the assignee of the present invention and application, discloses a scheme for conserving base station processing resources and available forward link power. All relevant portions of the mentioned patent application are incorporated by reference. Specifically, the scheme proposes a reduction of call handoff activity at a CDMA base station. That is, a user who might add a new base station to a list of potential base stations to which the user may be handed off, is maintained by only currently serving CDMA base stations as long as a minimum quality of call service is being provided.

Although a CDMA base station preferably should support multiple carriers at its site to allow for potential subscriber growth, current limitations of base station processors including the mentioned RCC, make it difficult at present to support more than three carriers in a CDMA system. User-related control functions that contribute significantly toward RCC processing time at a CDMA base station include, for example, handoffs of calls to or from the base station, or between sectors of the same base station; subscriber call originations (i.e., attempts by a user to initiate a call via the base station); and user call termination (i.e., connection of a call originating from a wired (telephone) network with which a base station is linked, to a user in the base station's cell). Each handoff typically occupies about 100 milliseconds of processing time at the base station. Each call origination and termination occupies about 75 milliseconds. User registration (i.e., system recognition of a user prior to placing or receiving a call), and paging of a user with operating data from the base station, each occupy about five milliseconds of the base station's processing time. Processing times may vary depending on the CPU used at the base station.

SUMMARY OF THE INVENTION

A technique is provided for allowing a base station of a cellular wireless communication system to manage an increasing number of active users in the base station's cell, without exceeding the capacity of the base station's call processing equipment.

According to the invention, a method of preventing an overload of call processing capacity at a base station of a cellular wireless communication system, includes monitoring a level of call processing at the base station and reducing a present handoff rate for user stations served by the base station when the monitored level of call processing exceeds a first threshold which is less than a maximum capacity of call processing at the base station. When the monitored level of call processing exceeds a second threshold greater than the first threshold, a present rate of call originations or terminations is reduced, while further reducing the handoff rate.

The inventive overload control scheme first reduces unnecessary handoff activities, and then limits so-called new arrival traffic to prevent a processor overload condition when control traffic cannot be reduced sufficiently by a reduction of handoff activity alone.

For a better understanding of the invention, reference is made to the following description taken in conjunction with the accompanying drawing and the appended claims.

BRIEF DESCRIPTION OF THE DRAWING

In the drawing:

FIG. 1 is a Table identifying certain activities and assumptions relating to call processing demands at a cellular base station;

FIG. 4 is a Table showing use of call processing time for new user calls and handoffs, for different handoff rates at a base station cell.

DETAILED DESCRIPTION OF THE INVENTION

Call processing capacity may be evaluated in terms of busy-hour call attempts (BHCA), i.e., the total number of call originations and terminations that a base station can process per hour during a period of peak call demand. The Table in FIG. 1 lists notations and assumptions used in BHCA calculations for a typical CDMA base station. Equation (1) below, incorporates the notations from the Table of FIG. 1 to arrive at an expression for radio control complex BHCA capacity (BHCA_RCC).

$$BHCA\_RCC = 3600*100(Max\_RCC - NoLoad\_RCC)/(7.5 + 10HO + 0.5(PG+AR)) \quad (Eq.1)$$

Figure 2:
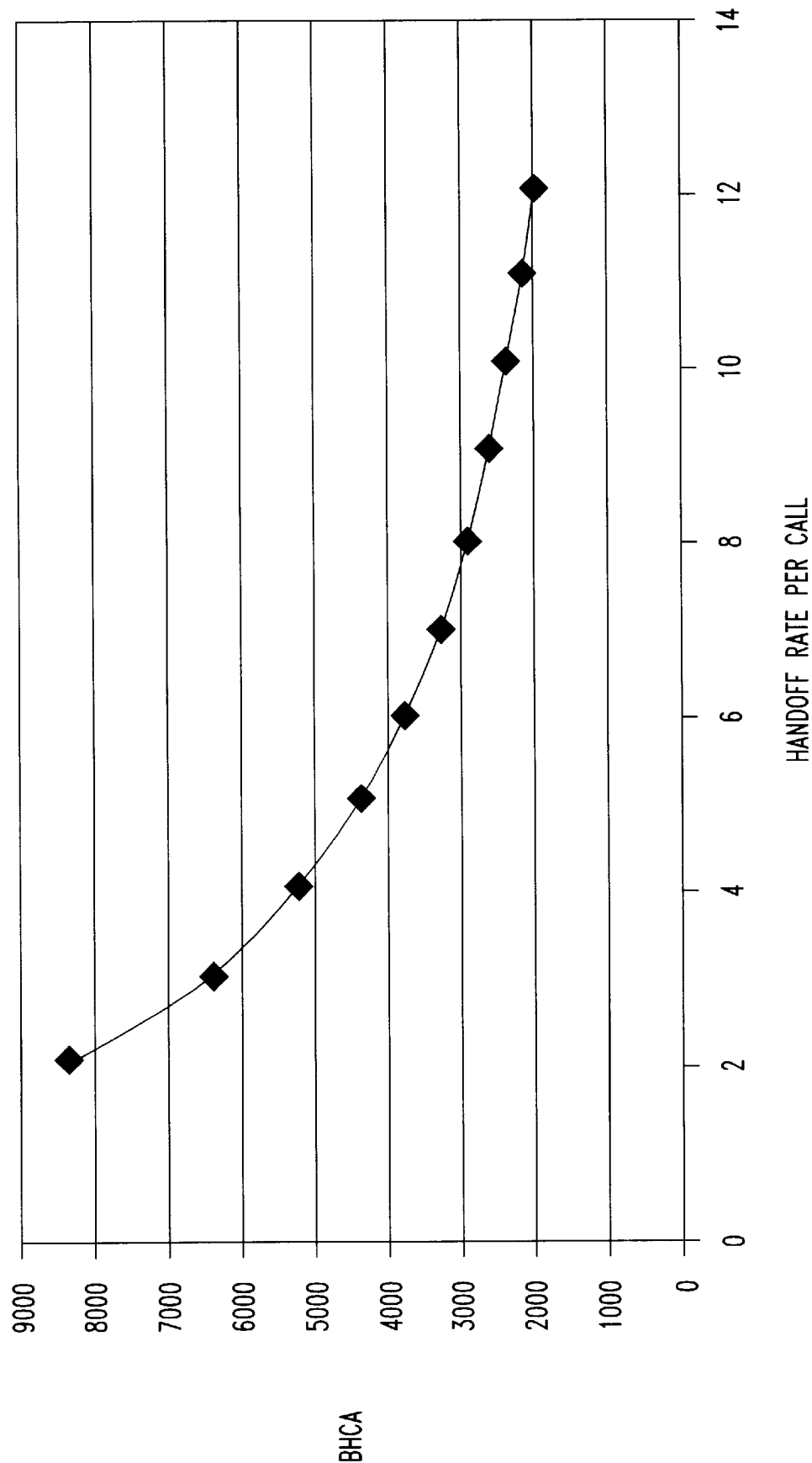
FIG. 2 is a graph showing a relation between busy hour call attempts and handoff rate at a base station cell.

From FIG. 1 and Eq. 1, the BHCA capacity at a typical base station is in the range of from 2037 to 8303 attempts per cell depending on the cell handoff rate characteristics. FIG. 2 shows a typical relationship between RCC BHCA and handoff rate as calculated from Eq. 1. It is seen that the handoff rate has a major impact on RCC BHCA capacity.

With a handoff rate of 12 per call, the maximum allowable BHCA is only about 2000 per cell. Assuming a typical three-sector cell, current RCC processing capacity will accommodate only one CDMA carrier. With a handoff rate in the range of 8 to 10 per call, processing capacity may allow for two CDMA carriers at one base station. Because maximum RCC overload thresholds are currently being reached during busy hours at two-carrier CDMA cells, an effective RCC processing overload control is needed to prevent a crash of an entire cell if a serious RCC overload situation develops.

To determine an effective processing overload control scheme, the following processing time demands are assumed for the corresponding call-related operations or activities:

| ACTIVITY | TIME |
|---|---|
| Origination/Termination | 75 msec |
| Handoff (Add + Drop) | 100 msec |
| Page | 5 msec |
| AR (Registration) | 5 msec |

Let $\lambda$ denote the arrival rate at a serving cell, $\mu=1/T$ denote service rate, and $\rho$ denote the utilization of CDMA channels of the serving cell. We then have $\rho=\lambda/\mu=\lambda T$, where T is the call holding time, and at any given time there are $\rho$ users in the serving cell. With this simplified model, RCC processing utilization for call origination/termination and handoffs, can be derived as $$RCC\_load/sec=No\_load+0.075\lambda+0.1\ (HO/T)\rho+\Delta=No\_load+0.075\lambda+0.1\ HO\lambda+\Delta=No\_load+(0.075+0.1\ HO)\lambda+\Delta$$

Wherein $\Delta$ is the contribution from paging of mobile users and mobile user registration. By considering call originations and termination (OT) and handoffs (HO) only, actual RCC processing time due to OT and HO is further analyzed.

Figure 3:
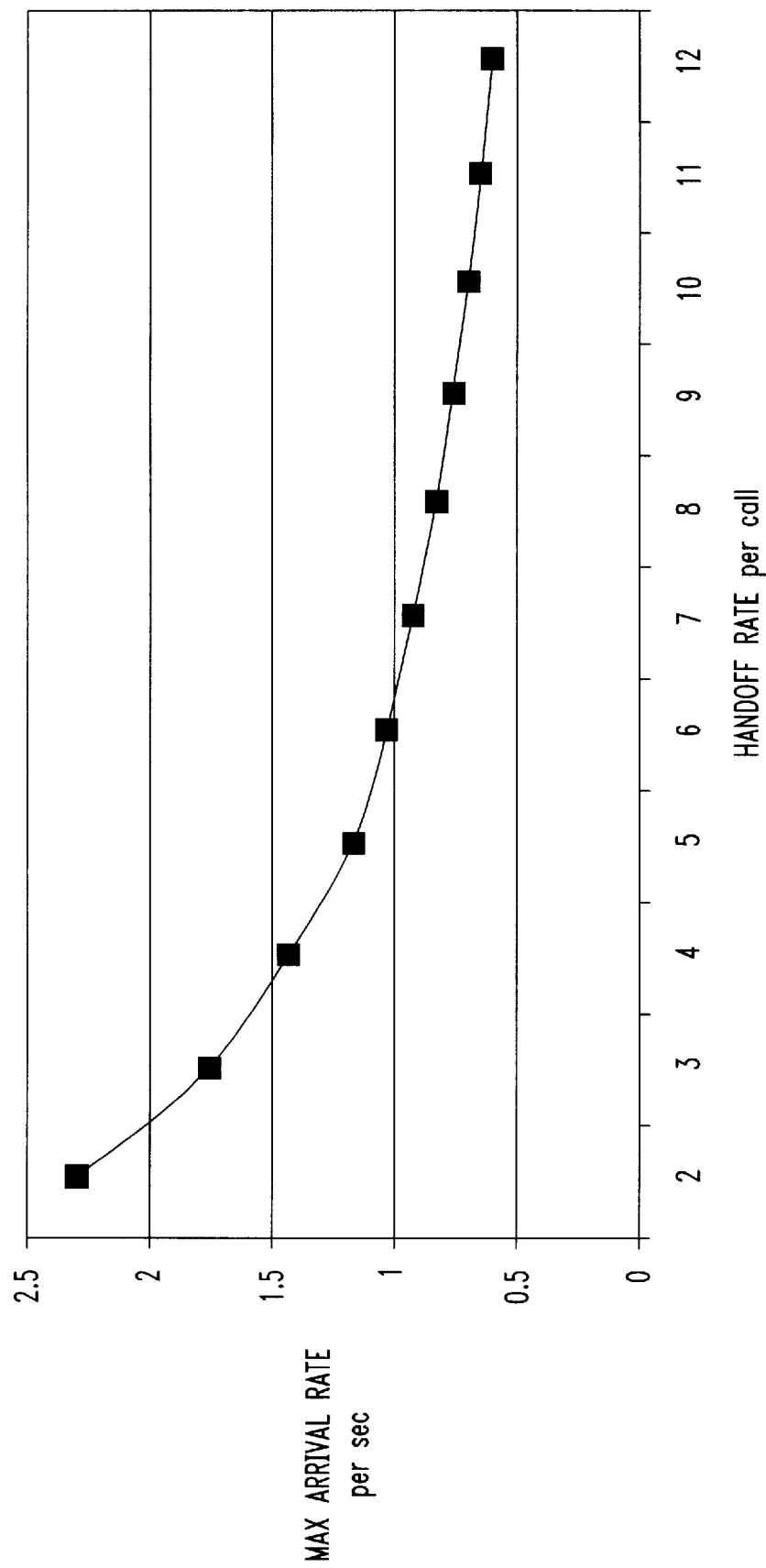
FIG. 3 is a graph showing a relation between maximum arrival rate and handoff rate at a base station cell.

As shown in FIG. 2, the call handoff rate has a large impact on RCC BHCA capacity. Thus, the allowable call arrival rate $\lambda$ is inversely proportional to the HO rate as shown in the graph of FIG. 3. At different handoff rates per call, the maximum allowable arrival rate (BHCA) is also different.

The Table of FIG. 4 shows that RCC processing utilization for OT and HO differs when a serving market has different handoff characteristics. FIG. 4 also shows a range of improvement upon reducing either OT or HO related traffic.

For example, if all calls are blocked during an overload situation, RCC processing load is reduced by 4% to 17%. Blocking new calls will have a later impact by reducing the number of active users at the later time. If, however, a present handoff rate is reduced by 10%, then the RCC processing utilization is reduced by from 4.6% to 6.8%. Because more than 63% of RCC processing demand is typically due to OT and HO, emphasis should be placed on reducing processing demands arising from call originations/terminations and handoffs.

"Two-Phase" Overload Control Scheme

Core processing load at a cellular base station is controlled by first reducing unnecessary user handoff activities in the base station's cell, and then further reducing BHCA traffic if processing overload conditions persist. According to FIG. 4, if a present handoff rate is reduced between 10% to 20%, RCC processing load is reduced by 5% to 14%. If such a handoff rate reduction will impact significantly on RF performance, or even impact on call drop rate, such a reduction should not be considered unless absolutely necessary to prevent a "crash." In the earlier mentioned patent application, a quality-based handoff reduction scheme reduces a present handoff rate by about 10% to 20% in a heavily loaded system, and has only a minor impact on RF performance. Therefore, in a first phase, a reduction of between 5% to 14% of RCC processing demand can be achieved almost without any cost to the user. If an RCC processing overload situation continues, then new arrival traffic at the cell may be limited in a second phase.

With respect to the mentioned second phase, a known "persistence test" algorithm, typically imbedded in CDMA mobile user stations, can be used to reduce or to redistribute access requests, thus reducing the arrival rate at a cell during a processing overload condition. Because the persistence test is applied normally to access requests, its use can only help to reduce user call originations and user registrations. Using the persistence test, a maximum reduction of between 2.5% to 10% in RCC processing demand can be obtained, assuming that at any given time 60% of processing time is devoted to new call originations. A 1% reduction may be achieved by a reduction in user registrations. A throttling algorithm for limiting new call origination and termination requests may be used to reduce the arrival traffic further. Again, there is a ripple effect that will reduce later RCC processing demands relating to handoff activity.

As mentioned, the maximum arrival rate that a base station can accommodate, is inversely proportional to a present user handoff rate in the base station's cell. Allowing a higher arrival rate at the cell thus limits the handoff rate if quality service is to be maintained. Because different service markets have different handoff characteristics, reducing only one of the arrival and the handoff rates at a cell will not necessarily result in a reduction of RCC processing demands.

The following notations are used to describe an example of a two-phase RCC processing overload control scheme as applied to a CDMA base station. It will be understood by those skilled in the art that the processing overload control scheme disclosed herein may also be applied advantageously at base stations of FDMA and TDMA cellular systems as well.

RCC_T_handoff: First RCC loading threshold for a first RCC Handoff Reduction Trigger (I)

RCC_$\delta$: A hysteresis constant for avoiding a ping-pong effect when triggering handoff rate reductions RCC_T_access: Second RCC loading threshold for a second RCC Access Control Trigger and Handoff Reduction Trigger (II)

At time m and with a known current arrival rate $\lambda_{mk}$, to control voice traffic to a threshold value $\lambda_T$ within the next K slots (T seconds), the required persistence test value P is $$P(m)=1-(1-\lambda_T/\lambda_{mk})^{1/K+1}$$

Here, we can choose $\lambda_T/\lambda_{mk}=\eta=0.5$, for RCC processing overload control.

Trigger_flag=0

N_overload=0 choose $\eta$=0.5 (step increment for access control factor)

choose $\delta$=0.5 (step increment for call quality factor)

If (RCC_Load>=RCC_T_handoff)

Handoff Reduction Trigger (I)

Trigger_flag=1

If (Trigger_flag=1 and RCC_Load<RCC_T_handoff−RCC_$\delta$)

Stop Handoff Reduction Trigger

Trigger_flag=0

If (RCC_Load>=RCC_T_access)

N_overload=N_overload+1;

Handoff Reduction Trigger (II)

T_quality=−8 dB−δ(N_overload)
   Access Control (Persistence Test for call origination)
   Plus Throttling Algorithm (for call Termination)
   η=η/(2*N_overload)
  Else
   N_overload=N_overload−1
   If N_overload<0
     N_overload=0

Handoff Reduction Trigger (I) and Handoff Reduction Trigger (II) are different in T_quality trigger. In (I), T_quality=−8 dB; and in (II), T_quality=(−8 dB−δ(N_overload)).

The value of T quality provides a reference for RF, i.e., wireless call link quality. For CDMA systems, the value corresponds to a combined pilot signal strength measurement $(Ec/Io)c$ made by a user station. With T_quality=−8 dB it has been shown that there is about a 21% handoff rate reduction, and with T_quality=−8.5 dB there is about a 28% handoff rate reduction. It should be noted that with T_quality=−8 dB RF performance remains satisfactory, but with T_quality<=−8.5 dB RF performance begins to degrade. Considering a given RCC processing overload situation, the costs of both blocking and degradation in RF performance are weighted equally. Thus, both access control and Handoff Reduction Trigger (II) should be implemented simultaneously in phase II of the disclosed scheme.

While the foregoing description represents a preferred embodiment of the invention, it will be obvious to those skilled in the art that various changes and modifications may be made without departing from the spirit and scope of the invention pointed out by the following claims.

We claim:

1. A method of preventing an overload of call processing capacity at a base station of a cellular wireless communication system, comprising:
   monitoring a level of call processing at the base station with respect to a maximum call processing capacity of the base station, wherein said call processing capacity includes processing of call handoffs, call originations and call terminations handled by the base station;
   setting a first call processing threshold which is less than the maximum call processing capacity of the base station;
   setting a second call processing threshold which is greater than the first call processing threshold but less than said maximum call processing capacity;
   reducing, in a first phase, a present handoff rate for user stations served by the base station when the monitored level of call processing exceeds the first threshold; and
   when the monitored level of call processing exceeds the second threshold,
   reducing, in a second phase, a present rate of at least one of the call originations and call terminations handled by the base station, while further reducing said handoff rate.

2. The method of claim 1, including reducing the present handoff rate by about 10% to 20% in said first phase.

3. The method of claim 1, including reducing the present rate of call originations by way of a persistence test associated with a user station, in said second phase.

4. The method of claim 1, including reducing the handoff rate in the second phase by such an amount that RF performance of the system only begins to degrade.

5. The method of claim 1, wherein the present rate of call originations or call terminations is reduced in said second phase, by delaying said call originations or terminations.

6. The method of claim 1, wherein the present rate of call originations or call terminations is reduced in said second phase, by denying said call originations or terminations.

7. A method of preventing an overload of call processing capacity at a base station of a cellular wireless communication system, comprising:
   monitoring a level of call processing at the base station:
   reducing, in a first phase, a present handoff rate for user stations served by the base station when the monitored level of call processing exceeds a first threshold which is less than a maximum capacity of call processing at the base station; and
   when the monitored level of call processing exceeds a second threshold greater than said first threshold,
   reducing, in a second phase, a present rate of at least one of call originations and call terminations, while further reducing said handoff rate, wherein the method is implemented according to the following scheme:

set Trigger_flag=0
set N_overload=0
if (RCC_Load>=RCC_T_handoff)
   Handoff Reduction Trigger (I)
   Trigger_flag=1
if (Trigger_flag=1 and RCC_Load<RCC_T_handoff−RCC_δ)
   Stop Handoff Reduction Trigger
   Trigger_flag=0
if (RCC_Load>=RCC_T_access)
   N_overload=N_overload+1;
   Handoff Reduction Trigger (II)
     T_quality=−8 dB−δ(N_overload)
   Access Control
     η=η/(2*N_overload)
else
   N_overload=N_overload−1
   if N_overload<0
     N_overload=0 wherein
   RCC_T_handoff: first RCC loading threshold for a first RCC Handoff Reduction Trigger (I),
   RCC_δ: hysteresis constant for avoiding a ping-pong effect when triggering handoff rate reductions,
   RCC_T_access: Second RCC loading threshold for a second RCC Access Control Trigger and Handoff Reduction Trigger (II);
   η=step increment for access control factor, and
   δ=step increment for call quality factor.

8. The method of claim 7, wherein η is about 0.5.

9. The method of claim 7, wherein δ is about 0.5.

10. The method of claim 7, including reducing the present handoff rate by about 10% to 20% in said first phase.

11. The method of claim 7, including reducing the present rate of call originations by way of a persistence test associated with a user station, in said second phase.

12. The method of claim 7, including reducing the handoff rate in the second phase by such an amount that RF performance of the system only begins to degrade.

13. The method of claim 7, wherein the present rate of call originations or call terminations is reduced in said second phase, by delaying said call originations or terminations.

14. The method of claim 7, wherein the present rate of call originations or call terminations is reduced in said second phase, by denying said call originations or terminations.

* * * * *